US011952246B2

United States Patent

(12) United States Patent
Hsieh

(10) Patent No.: US 11,952,246 B2
(45) Date of Patent: Apr. 9, 2024

(54) BRAKE WINCH WITH REVERSE RELEASE AND SELF-LOCKING FUNCTION

(71) Applicant: Wu-Chih Hsieh, Taichung (TW)

(72) Inventor: Wu-Chih Hsieh, Taichung (TW)

(*) Notice: Subject to any disclaimer, the term of this patent is extended or adjusted under 35 U.S.C. 154(b) by 4 days.

(21) Appl. No.: 17/668,783

(22) Filed: Feb. 10, 2022

(65) Prior Publication Data

US 2023/0249951 A1 Aug. 10, 2023

(51) Int. Cl.
*B66D 1/06* (2006.01)
*B66D 1/14* (2006.01)

(52) U.S. Cl.
CPC ................. *B66D 1/06* (2013.01); *B66D 1/14* (2013.01); *B66D 2700/05* (2013.01)

(58) Field of Classification Search
CPC ... B66D 1/04; B66D 1/06; B66D 1/14; B66D 1/16; B66D 1/20; B66D 1/28; B66D 1/30; B66D 1/34; B66D 1/36; B66D 1/7452; B66D 1/7468; B66D 1/7463; B66D 3/02; B66D 3/14; B66D 5/34; B66D 2700/0116; B66D 2700/0183; B66D 2700/05
USPC .......................................................... 254/357
See application file for complete search history.

(56) References Cited

U.S. PATENT DOCUMENTS 2,561,139 A * 7/1951 Sasgen ..................... B66D 1/06 254/350
2,649,281 A * 8/1953 Hastings, Jr. ............ B66D 5/22 254/344
4,469,308 A * 9/1984 Nakamura ............... B66D 3/14 74/577 M
4,483,519 A * 11/1984 Nakamura ............... B66D 3/14 254/350
5,238,226 A * 8/1993 Nishimura ............... B66D 3/14 254/352
6,554,255 B2 * 4/2003 Fujikawa ................ B66D 3/16 254/342
7,216,849 B2 * 5/2007 Tremblay .............. B60P 7/0846 24/69 ST (Continued)

FOREIGN PATENT DOCUMENTS

CN 105398995 A * 3/2016
CN 209306862 U * 8/2019
KR 100861080 B1 * 9/2008

*Primary Examiner* — Michael R Mansen
*Assistant Examiner* — Henrix Soto
(74) *Attorney, Agent, or Firm* — Egbert, McDaniel & Swartz, PLLC

(57) ABSTRACT

Disclosed is a brake winch with reverse release and self-locking functions. The brake winch has a housing with first and second side walls, an accommodating space, and an auxiliary bracket part. A rotating disk is screwed in the accommodating space. A main shaft is screwed on one side of the rotating disk in an interlocking manner. A screw adapter is screwed on the second side wall, and includes an inner connection end that is assembled with the main shaft, and its external end has a threaded groove. The axial displacement of a driving screw, which is screwed on the auxiliary bracket, is matched with the difference of forward and reverse rotation to form a screwing transmission or release mode between the stud section and the thread groove. A friction driving mechanism must prompt the drive screw, the clamping plate and the screw adapter to be in a tightly synchronized state.

3 Claims, 8 Drawing Sheets

(56) References Cited

U.S. PATENT DOCUMENTS

| | | | | |
|---|---|---|---|---|
| 7,344,121 | B1 * | 3/2008 | Pan | B66D 3/14 254/350 |
| 8,256,745 | B2 * | 9/2012 | Latoria | B66D 3/18 254/362 |
| 2015/0197413 | A1 * | 7/2015 | Doig | B63C 3/02 248/124.2 |

* cited by examiner

BRAKE WINCH WITH REVERSE RELEASE AND SELF-LOCKING FUNCTION

CROSS-REFERENCE TO RELATED U.S. APPLICATIONS

Not applicable.

BACKGROUND OF THE INVENTION

1. Field of the Invention

The present invention relates generally to a winch, and more particularly to the disclosure of an innovative brake winch structure type with reverse release and self-locking function.

2. Description of Related Art Including Information Disclosed Under 37 CFR 1.97 and 37 CFR 1.98

The winch of the present invention refers to a manual instrument with a hand (or power) driven rotating disk for rolling cable wire or stretching rope to assist the user to complete a specific work (e.g. hanging, pulling, etc.).

In the design of the known structure type of winch, considering operational safety, to avoid reverse motion of rotating disk released from hand as the rolling cable wire or rope drags or hangs a weight inducing dangerous accidents, a trip is mostly arranged to chuck the mechanism of unidirectional ratchet gear wheel for the rotating disk in one direction. In other words, the rotating disk only rotates in one direction (e.g. clockwise), when the rotating disk is to rotate in opposite direction (e.g. counterclockwise), it will not act as the trip chucks the rotating disk.

Following said operating characteristic of the known winch structure, to rotate the rotating disk in opposite direction when the user is operating the manual winch, the trip must be switched to release mode, and then the disk is reversed turn by turn by reversing the crank handle. However, if the user has to accelerate the contra-rotation, which cannot be implemented in fact, the only way is still to reverse the crank handle, so it is difficult to meet multiple application requirements, this is an important technical topic that deserves further attention.

BRIEF SUMMARY OF THE INVENTION

The primary object of the present invention is to provide a brake winch with reverse release and self-locking function. The technical problem to be solved is to develop a novel winch structure type with more ideal practicability.

Based on said object, the technical characteristic of problem solving of the present invention is that the brake winch includes: a housing, including a first side wall and a second side wall spaced apart. An accommodating space is configured between the first side wall and the second side wall and a rope exporting part formed in the accommodating space. An auxiliary bracket part is configured outside the second side wall. An auxiliary accommodating space is configured between the auxiliary bracket part and the second side wall. The auxiliary bracket part is configured with a shaft hole.

A rotating disk is screwed in between the first side wall and the second side wall of the housing, so that the rotating disk is located in the accommodating space, the rotating disk is wound with a rope.

A main shaft is screwed in between the first side wall and the second side wall of the housing, and the main shaft is parallelly disposed near the spacing on one side of the rotating disk. The main shaft has a first end and a second end, and the first end and the rotating disk are interlinked by a gear set.

A screw adapter is screwed on the second side wall of the housing. The screw adapter includes an inner connection end and an external end, wherein the inner connection end forms a sleeve joint part which is assembled with the second end of the main shaft to form synchronous rotation. The external end is configured with a thread groove.

A driving screw is screwed in the shaft hole of the auxiliary bracket part in an axially displaceable state, and the driving screw and the screw adapter are aligned on central axis. The driving screw is configured with a driven end, a stud section, a round rod section between the driven end and the stud section, and a pressure flange and an axially arranged section between the round rod section and the driven end. The axially arranged section is screwed in the shaft hole. The stud section faces towards the thread groove of the screw adapter, and as the axial displacement of the driving screw is matched with the difference of forward and reverse rotation, a screwing transmission mode or a release mode is configured between the stud section and the thread groove.

A clamping plate is configured with a circular shaft hole screwed on the round rod section of the driving screw. The clamping plate is configured with several unidirectional ratchets arranged annularly at intervals.

A unidirectional chucking piece is assembled in the auxiliary accommodating space and adjacent to the clamping plate. The unidirectional chucking piece elastically abuts on the corresponding unidirectional ratchet of the clamping plate in normal state, so that the clamping plate only rotates in one direction, its reverse rotation will be chucked.

A friction driving means is provided, making the pressure flange of the driving screw. The clamping plate and the screw adapter in a tightly synchronized state when the driving screw is displaced towards the screw adapter.

In terms of the main effect and advantage of the brake winch of the present invention, a temporary release mode between the driving screw and screw adapter can be formed by reversing operation of the driven end of driving screw in the course of operation. In this mode, the main shaft and rotating disk can meet the requirement for accelerating contra-rotation under the reverse drag effect of rope, so as to enhance the working efficiency, and when the brake winch is loaded, if the operational unit for the driven end of driving screw (e.g. crank handle) is removed, the winch braking function is not influenced, the operational safety remains, meeting multiple requirements in the use of winch products, there are practical progressiveness and better benefit of industrial use.

Another object of the present invention is the technical characteristic that an elastic underpropping component is assembled between the pressure flange of the driving screw and auxiliary bracket part, the pressure flange is elastically pushed towards the screw adapter in normal state, with the assistance of the elastic underpropping component, the driving screw elastically abuts on the screw adapter in normal state, so that the stud section can be easily screwed in the thread groove.

DETAILED DESCRIPTION OF THE INVENTION

Figure 1:
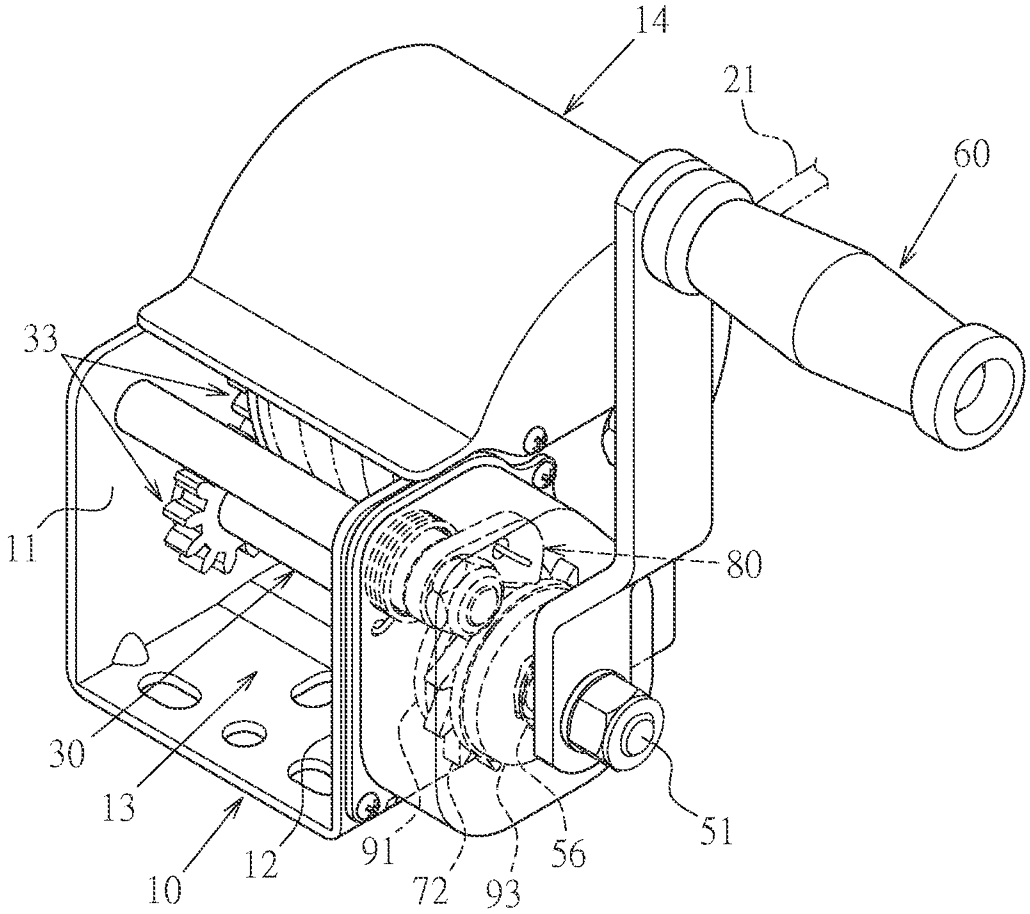
FIG. 1 is the combined stereogram of the preferred embodiment of the present invention.

FIG. 1 to FIG. 6 show the preferred embodiments of the brake winch with reverse release and self-locking function of the present invention, but the embodiments are for illustration only, the patent application is not limited to this structure.

The brake winch comprises a housing 10, including a first side wall 11 and a second side wall 12 spaced apart. An accommodating space 13 is configured between the first side wall 11 and the second side wall 12 and a rope exporting part 14 is formed in the accommodating space 13. An auxiliary bracket part 15 is configured outside the second side wall 12. An auxiliary accommodating space 16 is configured between the auxiliary bracket part 15 and the second side wall 12, and the auxiliary bracket part 15 is configured with a shaft hole 17. A rotating disk 20 is screwed in between the first side wall 11 and the second side wall 12 of the housing 10, so that the rotating disk 20 is located in the accommodating space 13. The rotating disk 20 is wound with a rope 21. A main shaft 30 is screwed in between the first side wall 11 and the second side wall 12 of the housing 10, and the main shaft 30 is parallelly disposed near the spacing on one side of the rotating disk 20. The main shaft 30 has a first end 31 and a second end 32, and the first end 31 and the rotating disk 20 are interlinked by a gear set 33. A screw adapter 40 is screwed on the second side wall 12 of the housing 10. The screw adapter 40 includes an inner connection end 41 and an external end 42. The inner connection end 41 forms a sleeve joint part 43 which is assembled with the second end 32 of the main shaft 30 to rotate synchronously. The external end 42 is configured with a thread groove 44. A driving screw 50 is screwed in the shaft hole 17 of the auxiliary bracket part 15 in an axially displaceable state, and the driving screw 50 and the screw adapter 40 are aligned on central axis. The driving screw 50 is configured with a driven end 51, a stud section 52, a round rod section 53 between the driven end 51 and the stud section 52, and a pressure flange 54 and an axially arranged section 55 between the round rod section 53 and the driven end 51. The axially arranged section 55 is screwed in the shaft hole 17. The stud section 52 faces towards the thread groove 44 of the screw adapter 40, and as the axial displacement of the driving screw 50 is matched with the difference of forward and reverse rotation, a screwing transmission mode or a release mode is configured between the stud section 52 and the thread groove 44. A clamping plate 70 is configured with a circular shaft hole 71 screwed on the round rod section 53 of the driving screw 50. The clamping plate 70 is configured with several unidirectional ratchets 72 arranged annularly at intervals. A unidirectional chucking piece 80 is assembled in the auxiliary accommodating space 16 and adjacent to the clamping plate 70. The unidirectional chucking piece 80 elastically abuts on the corresponding unidirectional ratchet 72 of the clamping plate 70 in normal state, so that the clamping plate 70 only rotates in one direction, and its reverse rotation is chucked. A friction driving means is provided, which makes the pressure flange 54 of the driving screw 50, the clamping plate 70 and the screw adapter 40 in a tightly synchronized state when the driving screw 50 is displaced towards the screw adapter 40.

Wherein the driven end 51 of the driving screw 50 is assembled with a crank handle 60, the crank handle 60 is rotated by a user to drive the driving screw 50.

Figure 3:
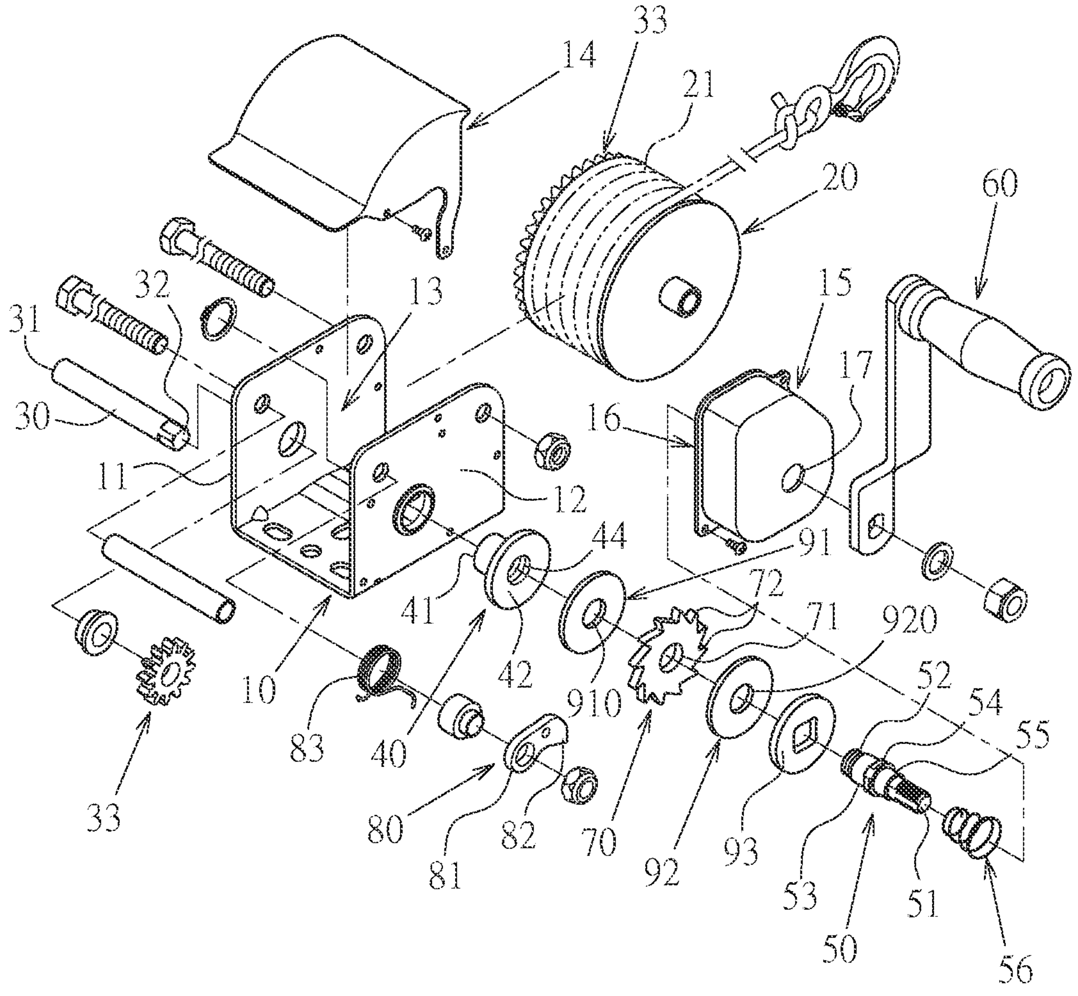
FIG. 3 is the exploded view of detail components in the preferred embodiment of the present invention.
Figure 4:
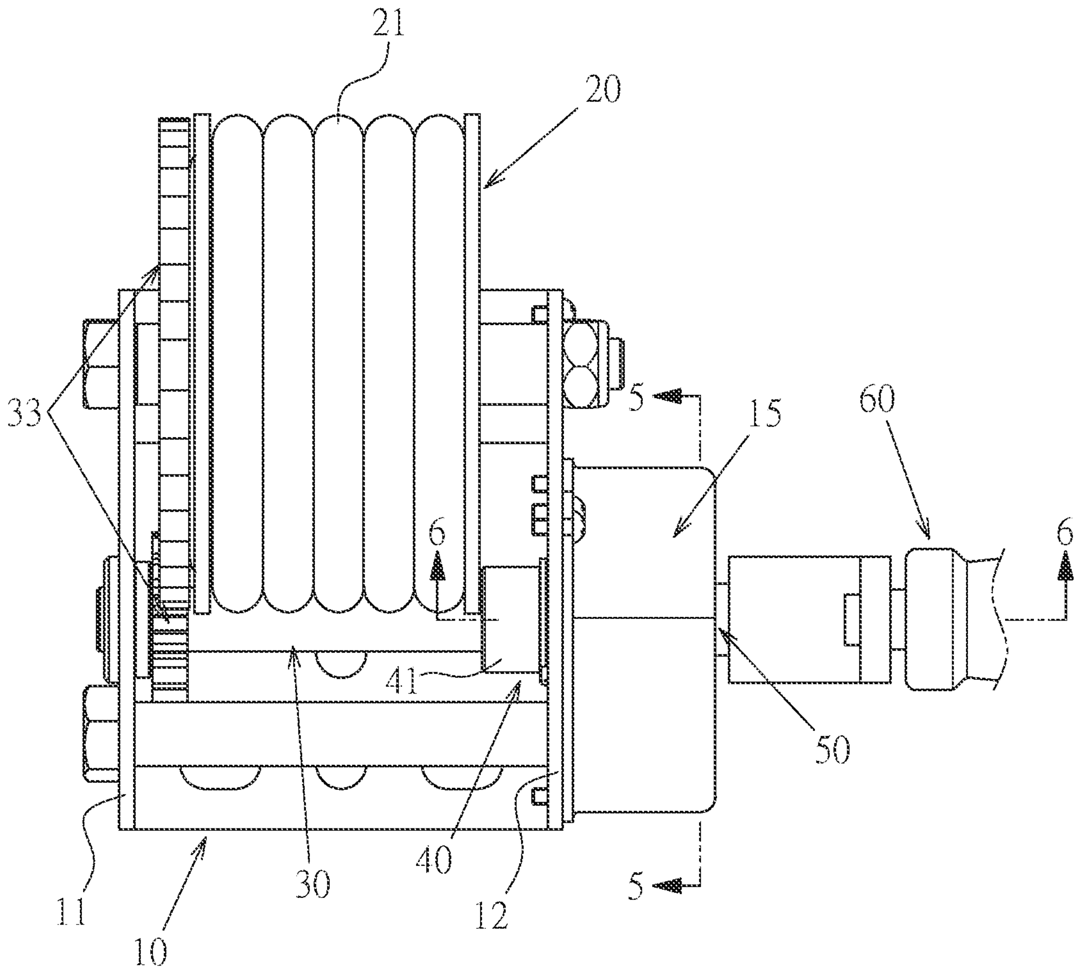
FIG. 4 is the top view of the preferred embodiment of the present invention.
Figure 5:
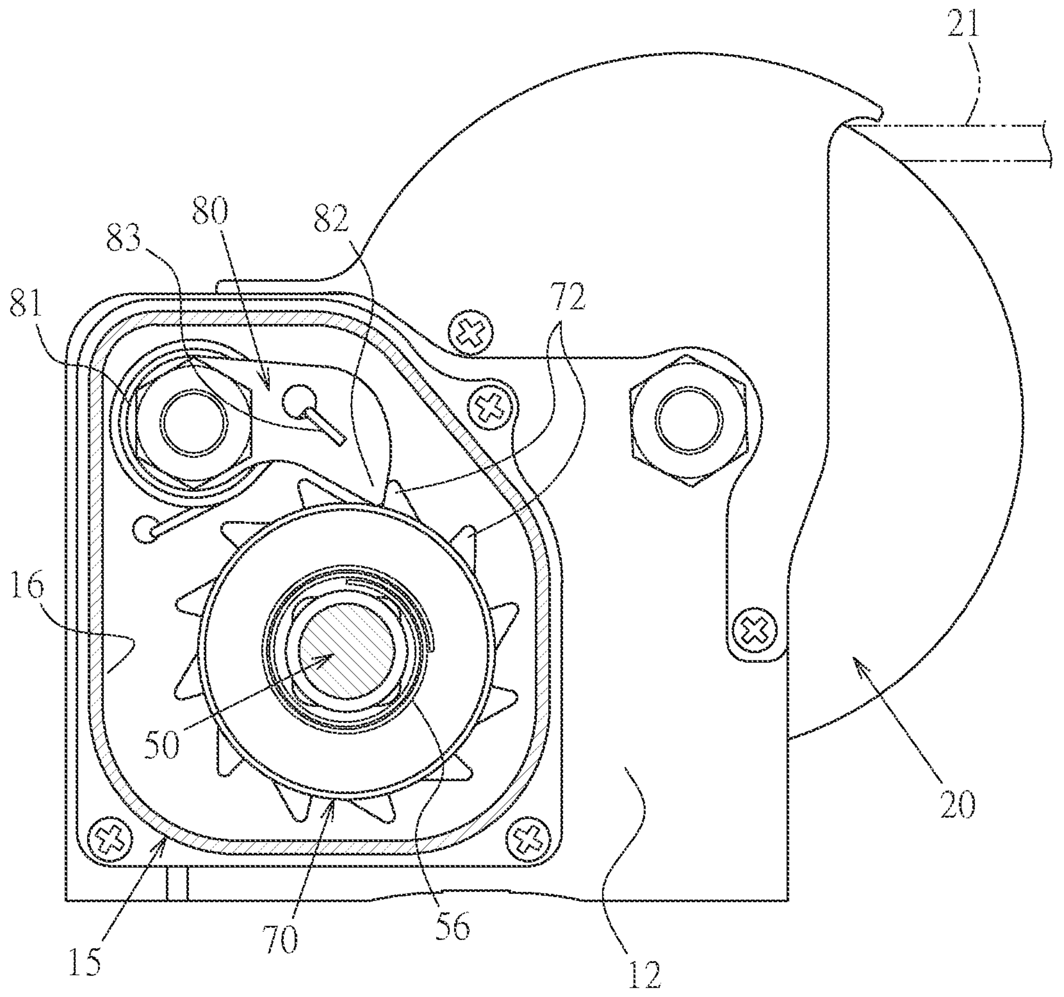
FIG. 5 is the 5-5 sectional view of FIG. 4.

As shown in FIG. 3 and FIG. 5, in this case, the unidirectional chucking piece 80 includes a rotating support end 81 and a swing latch end 82, in coordination with an elastic piece 83 (e.g. torque spring), the swing latch end 82 elastically abuts on the corresponding unidirectional ratchet 72 of the clamping plate 70 in normal state.

Figure 2:
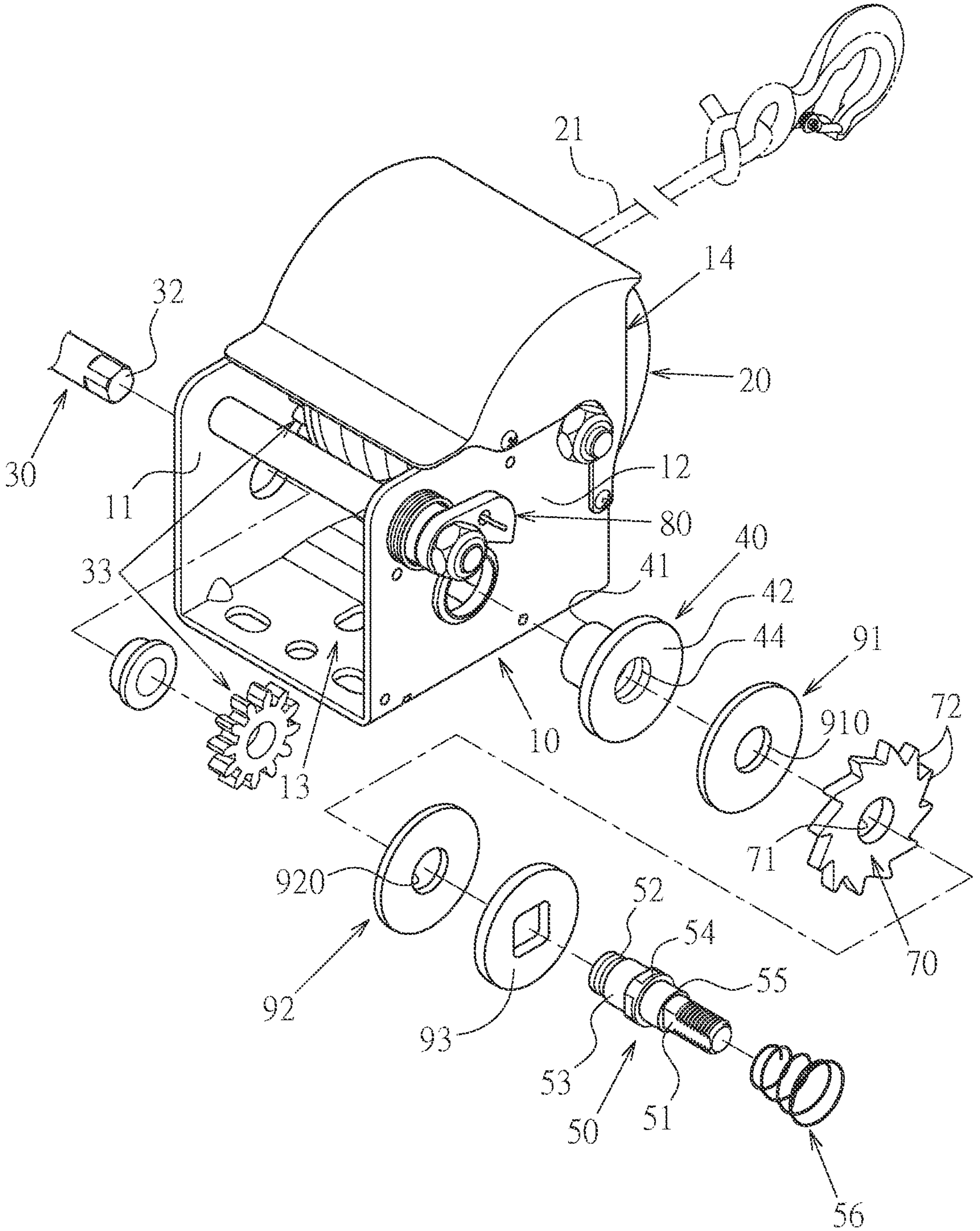
FIG. 2 is the exploded view of major components in the preferred embodiment of the present invention.

As shown in FIG. 2, in this case, said friction driving means includes a friction component 90, said friction component 90 includes a first friction plate 91 and a second friction plate 92. The first friction plate 91 and the second friction plate 92 are configured with a circular sleeve hole 910, 920 respectively screwed on the round rod section 53 of the driving screw 50, and the clamping plate 70 is sandwiched in between the first friction plate 91 and the second friction plate 92. The outside of the first friction plate 91 facially corresponds to the external end 42 of the screw adapter 40. The outside of the second friction plate 92 separately corresponds to the auxiliary bracket part 15 and is assembled with a propping component 93 (a plate). When the driving screw 50 is displaced towards the screw adapter 40, the pressure flange 54 is oppositely linked with the propping component 93, so as to drive the first friction plate 91, the second friction plate 92 and the clamping plate 70 to be in a tightly synchronized state.

Figure 6:
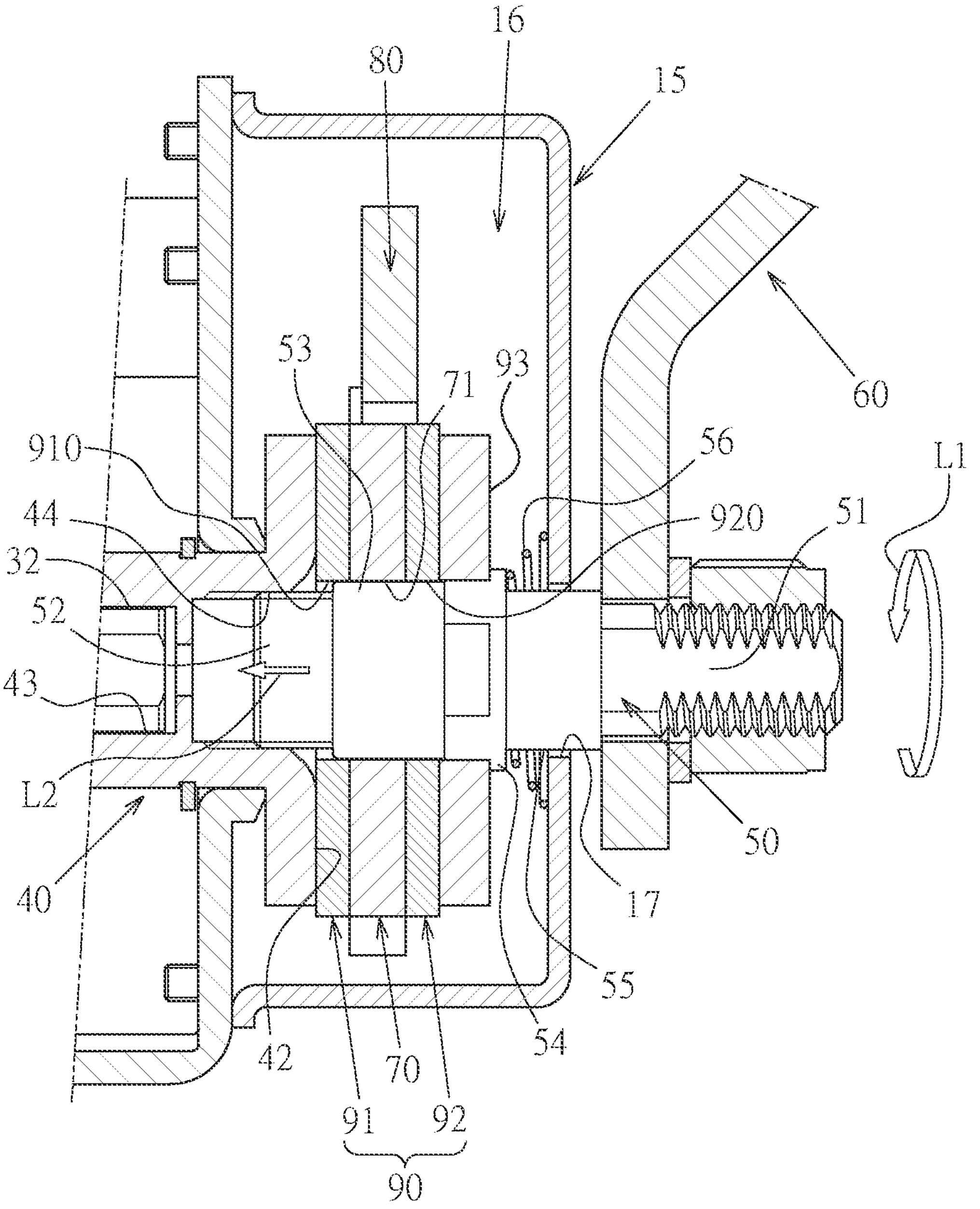
FIG. 6 is the 6-6 sectional view of FIG. 4, showing the screwing transmission state between the stud section and thread groove.

As shown in FIG. 2 and FIG. 6, in this case, an elastic underpropping component 56 (e.g. a conical spring) is assembled between the pressure flange 54 of the driving screw 50 and the auxiliary bracket part 15 to elastically push the pressure flange 54 towards the screw adapter 40 in normal state. The implementation pattern disclosed in this case provides the elastic underpropping component 56 to assist the driving screw 50 to elastically abut on the screw adapter 40 in normal state, so that the stud section 52 and the thread groove 44 are easy to be aligned and screwed (meshed) with each other.

Further, an assistant component (not shown in the figure) can be assembled between the pressure flange 54 of the driving screw 50 and the auxiliary bracket part 15 to make the driving screw 50 approach the screw adapter 40 in normal state. The assistant component in this case can be but not limited to a magnetic body, which generates pushing or pulling force by the principle of magnetic attraction or repulsion.

Further, the pressure flange 54 is adjacent to the round rod section 53.

Figure 7:
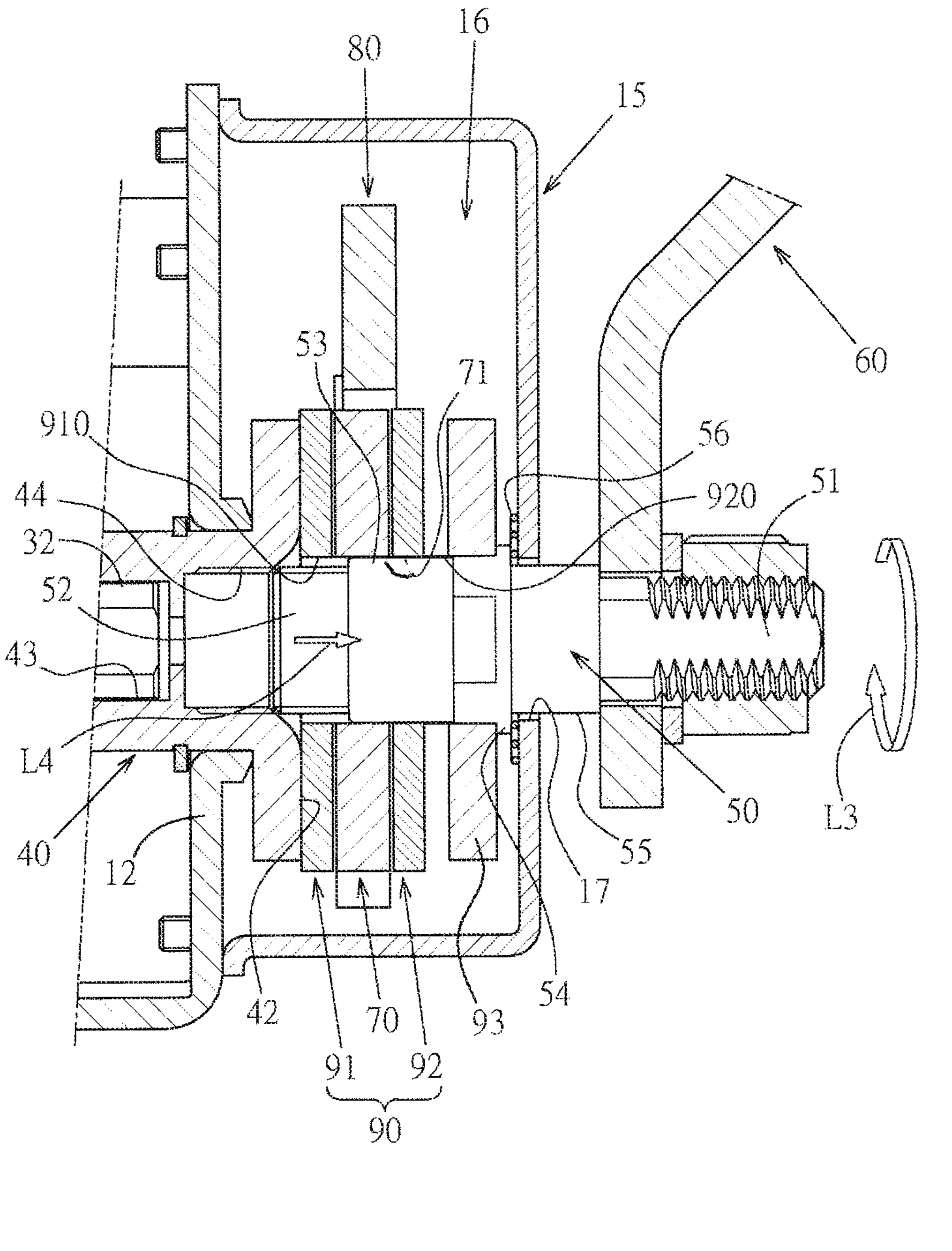
FIG. 7 is the longitudinal section view of local structure of the preferred embodiment of the present invention, showing the release mode between the stud section and thread groove.

Based on said structural composition and technical characteristic, in terms of said preferred embodiment, the practical application of the brake winch with reverse release and self-locking function disclosed in the present invention is shown in FIG. 6. When the user rotates the crank handle 60 clockwise (Arrow L1), the stud section 52 of driving screw 50 is rotated clockwise synchronously, so that the stud section 52 is screwed in the thread groove 44 of screw adapter 40, forming said screwing transmission mode. The main shaft 30 is driven in this mode. The gear set 33 drives the rotating disk 20 to rotate, and when the driving screw 50 is displaced towards the screw adapter 40 (Arrow L2), the pressure flange 54 oppositely pushes the first friction plate 91 and the second friction plate 92 of friction component 90 to be in a tightly synchronized state with clamping plate 70, so the clamping plate 70, driving screw 50, screw adapter 40 and main shaft 30 are integrated into a synchronously rotating structure. As shown in FIG. 7, when the user rotates the crank handle 60 counterclockwise (Arrow L3), the stud section 52 of driving screw 50 is rotated counterclockwise at the same time, so that the stud section 52 is reversely screwed off the thread groove 44 of screw adapter 40, forming said release mode. In this mode, the main shaft 30 is temporarily disengaged from the drive of screw adapter 40, and with the reverse displacement of driving screw 50 (Arrow L4), the pressing state of the pressure flange 54 is released temporarily, so that the tightly synchronized state of the first friction plate 91, the second friction plate 92 and clamping plate 70 is temporarily relaxed. If the user intentionally applies a force to keep the driving screw 50 in this state, i.e. avoiding the stud section 52 and the thread groove 44 of screw adapter 40 restoring the screw locking state, the main shaft 30 and rotating disk 20 are in free state temporarily, and then the user can use this state to rapidly release the rope 21 of rotating disk 20, instead of rotating the crank handle 60 turn by turn, so as to enhance the working efficiency.

Figure 8:
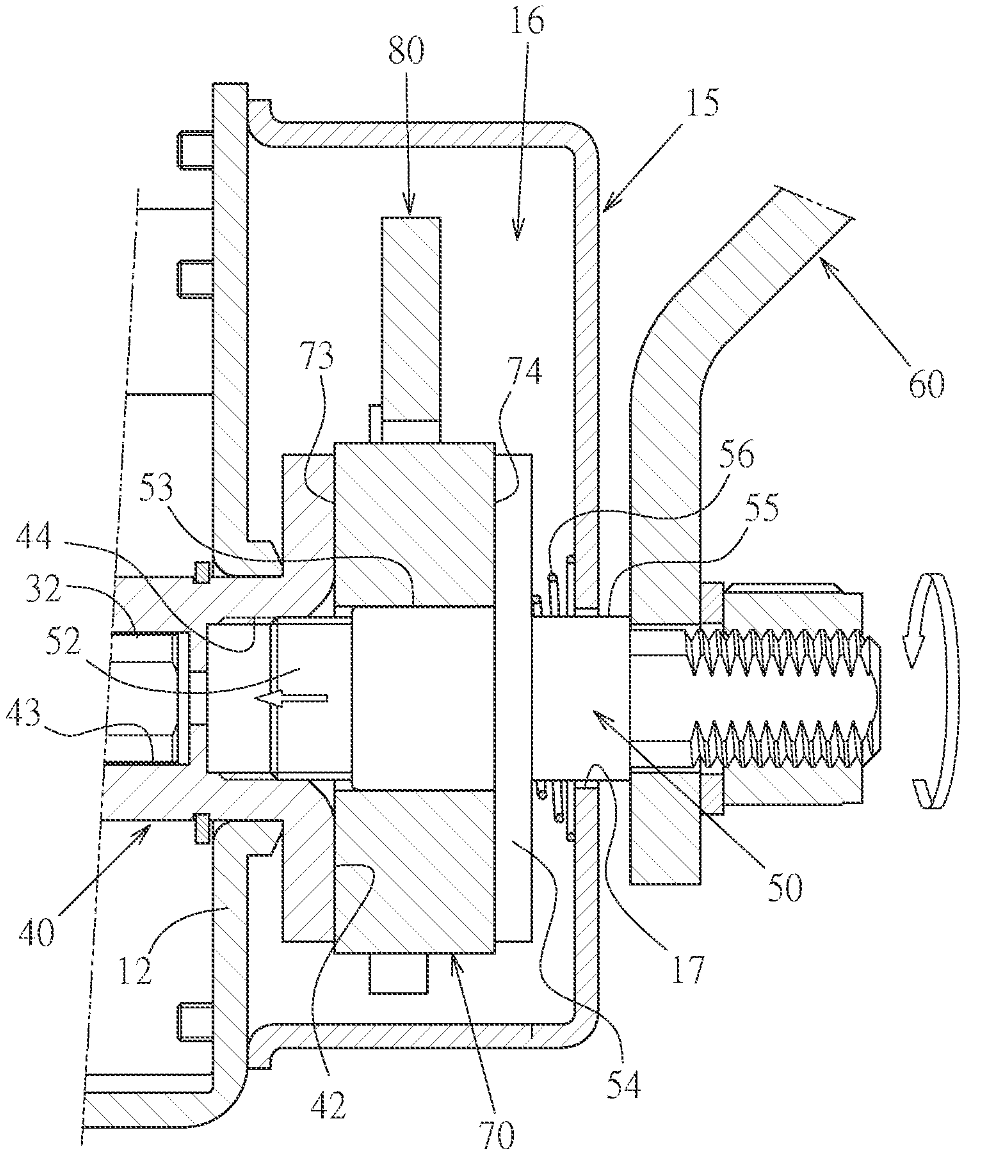
FIG. 8 is another preferred embodiment diagram of said friction driving means in the present invention.

As shown in FIG. 8, in this case, said friction driving means includes a first friction surface 73 and a second friction surface 74 formed on two opposite sides of the clamping plate 70. The first friction surface 73 facially corresponds to the external end 42 of the screw adapter 40. The second friction surface 74 facially corresponds to the pressure flange 54 of the driving screw 50. When the driving screw 50 is displaced towards the screw adapter 40, the pressure flange 54 of the driving screw 50, the clamping plate 70 and the screw adapter 40 are in a tightly synchronized state. This is another specific embodiment of said friction driving means.

I claim:

1. A brake winch with a reverse release and a self-locking function, the brake winch comprising:

a housing having a first side wall and a second side wall in spaced relation, the first side wall and the second side wall defining an accommodating space therebetween, the accommodating space having a rope exporting part formed therein, the second side wall having an auxiliary bracket part on an exterior thereof, the auxiliary bracket part and the second side wall defining an auxiliary accommodating space therebetween, the auxiliary bracket part having a shaft hole therein;

a rotating disk screwed between the first side wall and the second side wall of said housing, said rotating disk being positioned in the accommodating space, said rotating disk having a rope wound therearound;

a main shaft screwed between the first side wall and the second side wall of said housing, said main shaft being disposed parallel to one side of said rotating disk, said main shaft having a first end and, a second end, the first end of said main shaft being linked by a gear set to said rotating disk;

a screw adapter on the second side wall of said housing, said screw adapter having an inner connection end and an external end, wherein the inner connection end forms a sleeve joint part assembled onto the second end of said main shaft so as to rotate synchronously therewith, the external end of said screw adapter having a thread groove;

a driving screw screwed in the shaft hole of the auxiliary bracket part and axially displaceable therewith, said driving screw and said screw adapter being aligned along a central axis, said driving screw having a driven end and a stud section and a round rod section positioned between the driven end and the stud section, the round rod section and the driven end having a pressure flange and an axially arranged section therebetween, the axially arranged section being screwed into the shaft hole, the stud section facing the thread groove of said screw adapter, the stud section and the thread groove having a screw transmission mode or a release mode therebetween as an axial displacement of said driving screw matches a difference of forward rotation and reverse rotation;

a clamping plate having a circular shaft hole screwed on the round rod section of said driving screw, said clamping plate having a plurality of unidirectional ratchets arranged in spaced relation therearound;

a unidirectional chucking piece assembled in the auxiliary accommodating space adjacent to said clamping plate, said unidirectional chucking piece elastically abutting on a corresponding unidirectional ratchet of the plurality of unidirectional ratchets of said clamping plate in a resting state such that said clamping plate only rotates in a single direction and in which a rotation opposite to the single direction is chucked; and said pressure flange of said driving screw applying pressure onto said clamping plate and said screw adapter so as to synchronize a movement of said driving screw and said clamping plate and said screw adapter when said driving screw moves toward said screw adapter, wherein said pressure flange has a friction component, the friction component having a first friction plate and a second friction plate, the first friction plate and the second friction plate having said clamping plate sandwiched therebetween, the first friction plate having an exterior facing the external end of said screw adapter, the second friction plate having an exterior assembled with a propping component, wherein said pressure flange is linked to the propping component when said driving screw is displaced toward said screw adapter so as to synchronize the first friction plate and the second friction plate and said clamping plate, wherein said pressure flange and the auxiliary bracket part have an elastic underpropping component, assembled therebetween so as to elastically urge said pressure flange toward said screw adapter in a resting state, wherein said main shaft and said driving screw do not contact each other such as to maintain a neutral state, wherein a length of the shaft hole from the thread groove to the auxiliary bracket part is greater than a length from an end of said driving screw to an outer end of said pressure flange, wherein said unidirectional chucking piece has a rotating support end and a swing latch end coordinated with an elastic piece, the swing latch end coordinated with the elastic piece, the swing latch end elastically abutting the one of the unidirectional ratchets of said plurality of unidirectional ratchets when in the resting state.

2. The brake winch of claim 1, wherein said pressure flange is adjacent the round rod section.

3. The brake winch of claim 1, wherein the driven end of said driving screw has a crank handle assembled thereto, the crank handle adapted to be rotated by a use in order to drive said driving screw.

* * * * *